US008041785B2

(12) United States Patent
Mazur et al.

(10) Patent No.: US 8,041,785 B2
(45) Date of Patent: Oct. 18, 2011

(54) PROGRAMMATICALLY CHOOSING A ROUTER CONFIGURATION PROVIDER

(75) Inventors: Leszek Mazur, Bellevue, WA (US); Sean David Daniel, Redmond, WA (US); Adam C. DePue, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 11/654,294

(22) Filed: Jan. 17, 2007

(65) Prior Publication Data

US 2008/0172477 A1 Jul. 17, 2008

(51) Int. Cl.
*G06F 15/177* (2006.01)

(52) U.S. Cl. .......................... 709/220; 709/219; 709/221

(58) Field of Classification Search .......... 709/201–203, 709/217–222, 230, 250; 370/338
See application file for complete search history.

(56) References Cited

U.S. PATENT DOCUMENTS

| | | | | |
|---|---|---|---|---|
| 5,590,069 | A * | 12/1996 | Levin | 365/96 |
| 5,787,246 | A * | 7/1998 | Lichtman et al. | 709/220 |
| 5,852,722 | A | 12/1998 | Hamilton | |
| 5,974,461 | A * | 10/1999 | Goldman et al. | 709/224 |
| 6,028,846 | A * | 2/2000 | Cain | 370/250 |
| 6,131,119 | A * | 10/2000 | Fukui | 709/224 |
| 6,269,398 | B1 * | 7/2001 | Leong et al. | 709/224 |
| 6,366,563 | B1 | 4/2002 | Weldon et al. | |
| 6,629,145 | B1 * | 9/2003 | Pham et al. | 709/230 |
| 6,735,619 | B1 | 5/2004 | Sawada | |
| 6,842,769 | B1 * | 1/2005 | Kim et al. | 709/203 |
| 6,959,329 | B2 * | 10/2005 | Thakor | 709/220 |
| 6,978,301 | B2 * | 12/2005 | Tindal | 709/223 |
| 7,039,688 | B2 | 5/2006 | Matsuda et al. | |
| 7,103,650 | B1 | 9/2006 | Vetrivelkumaran et al. | |
| 7,111,054 | B2 * | 9/2006 | Lo | 709/220 |
| 7,150,037 | B2 * | 12/2006 | Wolf et al. | 726/6 |
| 7,249,170 | B2 * | 7/2007 | Tindal et al. | 709/223 |
| 7,392,301 | B1 * | 6/2008 | Perry et al. | 709/221 |
| 7,600,003 | B1 * | 10/2009 | Okmianski et al. | 709/220 |
| 7,734,738 | B2 * | 6/2010 | Daniel et al. | 709/220 |
| 7,752,625 | B2 * | 7/2010 | Larson | 718/104 |
| 2002/0026504 | A1 * | 2/2002 | Lo | 709/220 |
| 2003/0018755 | A1 * | 1/2003 | Masterson et al. | 709/220 |
| 2003/0041136 | A1 | 2/2003 | Cheline et al. | |

(Continued)

OTHER PUBLICATIONS

Decasper et al. "Router Plugins: A Modular and Extensible Software Framework for Modern High Performance Integrated Services Routers" http://web.archive.org/web/20060902173228/http://www.arl.wustl.edu/projects/archive/gigabitkits/References/Router_Plugins/wucs-98-08.pdf.*

(Continued)

*Primary Examiner* — Salad Abdullahi
*Assistant Examiner* — Jimmy H Tran (57) ABSTRACT

Described is a technology by which network server software has an interface into which a plurality of software router providers, that have methods to configure routers, may be plugged in. The network server software communicates with each provider to determine each of the provider's capabilities with respect to configuring a connected network router. A router provider is chosen based on that provider's capabilities in order to configure the router. In one example implementation, a router configuration component of the network software passes an IP address of the router to each provider and receives a score in return that indicates that provider's capabilities with respect to configuring the connected router. The provider with the best score is chosen for use in configuring the router. The score is built from weighted values, with more weight given to the capabilities deemed more valuable to users who need to configure routers.

20 Claims, 4 Drawing Sheets

U.S. PATENT DOCUMENTS

| | | | | |
|---|---|---|---|---|
| 2003/0172145 | A1* | 9/2003 | Nguyen | 709/223 |
| 2003/0179703 | A1* | 9/2003 | Levy et al. | 370/230 |
| 2004/0010778 | A1 | 1/2004 | Kaler et al. | |
| 2004/0243968 | A1* | 12/2004 | Hecksel | 717/100 |
| 2005/0044265 | A1* | 2/2005 | Vinel et al. | 709/238 |
| 2005/0076114 | A1* | 4/2005 | Cook | 709/224 |
| 2006/0013236 | A1* | 1/2006 | Fischer | 370/401 |
| 2006/0072543 | A1 | 4/2006 | Lloyd et al. | |
| 2006/0173979 | A1* | 8/2006 | Roellgen | 709/221 |
| 2006/0212547 | A1* | 9/2006 | Deleu et al. | 709/220 |
| 2007/0005887 | A1* | 1/2007 | Larson | 711/118 |
| 2007/0025310 | A1* | 2/2007 | Weng et al. | 370/338 |
| 2007/0058567 | A1* | 3/2007 | Harrington et al. | 370/254 |
| 2007/0094338 | A1* | 4/2007 | Kirkham | 709/206 |
| 2007/0101342 | A1* | 5/2007 | Flegg et al. | 719/321 |
| 2007/0203748 | A1* | 8/2007 | Rothpearl et al. | 705/2 |
| 2008/0016233 | A1* | 1/2008 | Schneider | 709/230 |
| 2008/0046569 | A1* | 2/2008 | DePue et al. | 709/227 |
| 2009/0147700 | A1* | 6/2009 | Sewall et al. | 370/254 |

OTHER PUBLICATIONS

Christine R. Wright et al.; A tutorial on binary number; Sep. 6, 2006; http://web.archive.org/web/20060906014328/http://www.cs.grinnell.edu/~rebelsky/Courses/CS152/97F/Readings/student-binary.html.*

Florian Braun; Reconfigurable Router Modules Using Network Protocol Wrappers; 2001; p. 254-263.*

Braun, et al., "Reconfigurable Router Modules Using Network Protocol Wrappers", http://www.inf.uni-konstanz.de/disy/publications/waldvogel/braun01reconfigurable.pdf.

Decasper, et al., "Router Plugins a Modular and Extensible Software Framework for Modern High Performance Integrated Services Routers", http://www.seas.wustl.edu/Research/FileDownload.asp?88.

Kohler, et al., "The Click Modular Router", Date: 2000, http://www.cs.ucla.edu/~kohler/z/kohler00click-yapteaparprfotci.pdf.

* cited by examiner

PROGRAMMATICALLY CHOOSING A ROUTER CONFIGURATION PROVIDER

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

INCORPORATION-BY-REFERENCE OF MATERIALS FILED ON COMPACT DISC

The present application includes a Computer Program Listing filed on a single compact disc (CD), filed in duplicate. The Computer Program Listing is presented in a single file on each CD and is named ComputerProgramListing. The Computer Program Listing was last modified Jun. 29, 2011 at 4:16 PM and comprises 11.5 kilobytes.

BACKGROUND

When a server is added to an existing network, problems may arise with the network's router that require the router to be reconfigured. For example, in a small business or home office network that operates without a server, routers purchased from typical chain stores are prepared to work with client computers, generally building a networking infrastructure for global access to the Internet, while assuming no Intranet services. When a server is later added to such a network, the router is not configured for the now-existing infrastructure on the local area network (Intranet).

Configuration of a router is not particularly straightforward for most computer users. Most router manufacturers typically rely on web-based administration of the router's features (although some manufacturers use Telnet). While programmatic access via UPnP (Universal Plug-and-Play) is sometimes accessible, it is often disabled on routers, and is virtually always incomplete. This because router manufactures tend not to fully support UPnP due to inherent insecurities embedded in the UPnP protocol.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which network software (e.g., in a server) communicates with a plurality of router providers that have methods to configure routers, to determine each of the provider's capabilities with respect to configuring a network router. A router provider is chosen based on that provider's capabilities in order to configure the router.

In one example implementation, a router configuration component of the network software is coupled to the plurality of providers via a defined interface to determine each provider's capabilities with respect to configuring the router. For example, the router configuration component passes an IP address of the router to each provider and receives a score in return. In this example, the score comprises a sum of values, wherein the values are weighted such that port mapping capability has a higher weight than dynamic host configuration protocol (DHCP) switch configuration capability, which has a higher weight than Network Address Translation (NAT) switch configuration capability, which has a higher weight than HTTPS manual configuration capability, which has a higher weight than HTTP manual configuration capability, which has a higher weight than Telnet manual configuration capability. The router provider associated with the best returned score is chosen for use in configuring the router.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Programmatically Choosing a Router Configuration Provider

Various aspects of the technology described herein are generally directed towards selecting a provider that reconfigures a router in an existing network, in which a provider comprises a software component containing logic (e.g., configuration methods) that can evaluate and/or configure a router to the extent of that router's capabilities. Other aspects are directed to selecting a provider when a new router is added to a network, for the purpose of initially configuring that router.

In one example implementation, there is a described a server with software into which providers may simply plug in, e.g., via a defined interface. For example, default providers are included with the server software, and other vendors such as router manufacturers or third party software suppliers may distribute a provider, such as via a CD-ROM or other media (or possibly downloadable or in firmware) included with the router. While one example interface is described, it can be readily appreciated that any way to couple a component to software is suitable for use with the concepts described herein.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
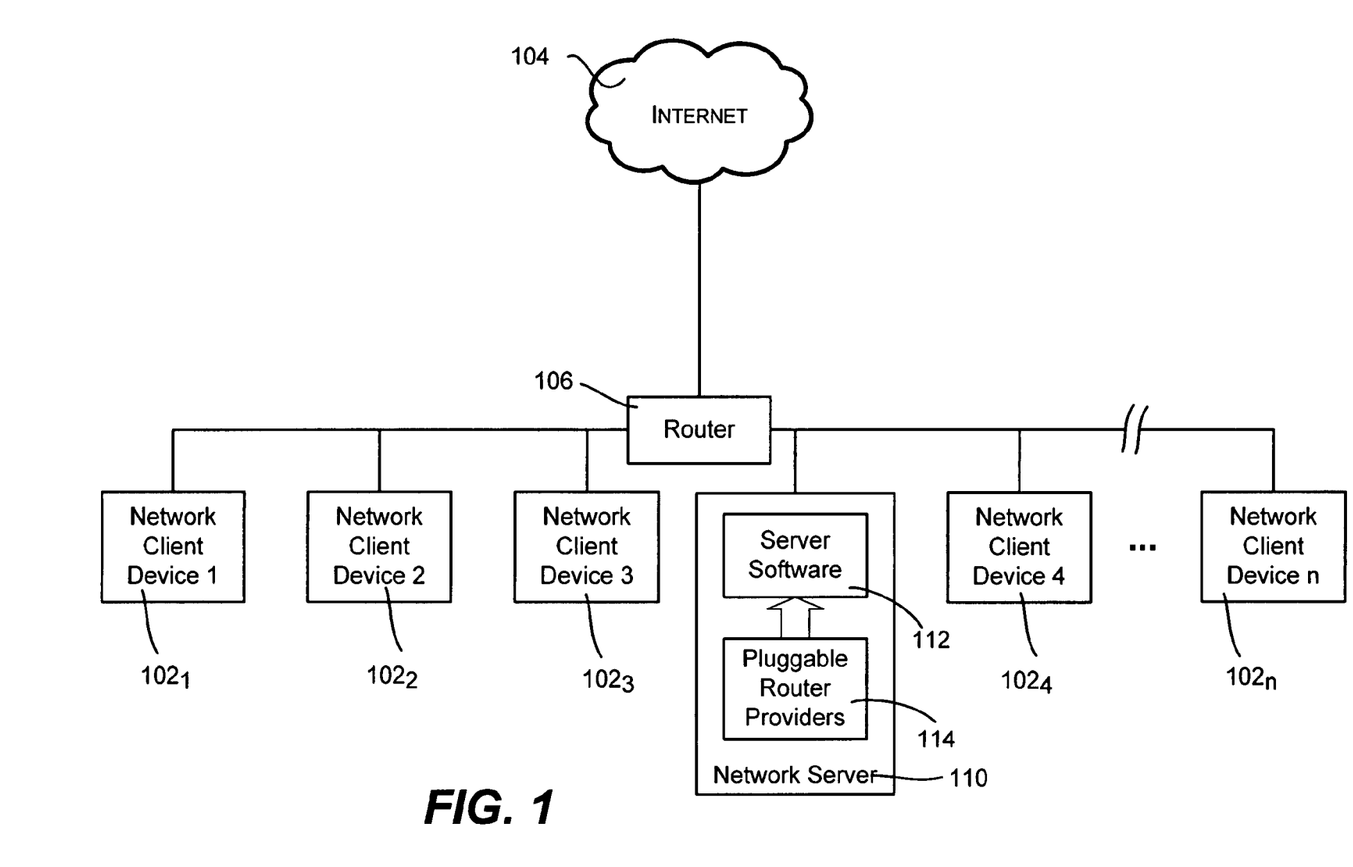
FIG. 1 shows an illustrative example of a general-purpose network computing environment into which various aspects of router configuration may be incorporated.

FIG. 1 shows an example network arrangement for a hypothetical business or home, in which a number of computing devices $102_1$-$102_n$ are coupled to one another and to the internet 104 via a router 106. The computing devices $102_1$-

$102_n$ may be any device capable of running code and/or containing logic. Note that the technology described herein may apply to many other products and configurations, including one a peer-to-peer network, or more complex configurations. For example, although not shown in FIG. 1, it is understood that various other networking components may be present, e.g., other routers, switches, hubs, modems, and hardware-based firewalls.

A network server 110 including a software image 112 for server/networking functionality and a network card 114 is coupled to the network, such as when received from a manufacturer. As described below, the coupling of the network server 110 typically necessitates reconfiguring the router to operate with the intranet that now exists. Alternatively, as also described below, a different router may be substituted into the network, requiring its configuration for use with the intranet. In general, the server software 112 is configured to communicate with pluggable router providers 114, choose one (typically the best) provider for configuring the router 106, and configure the router in conjunction with the chosen provider.

Figure 2:
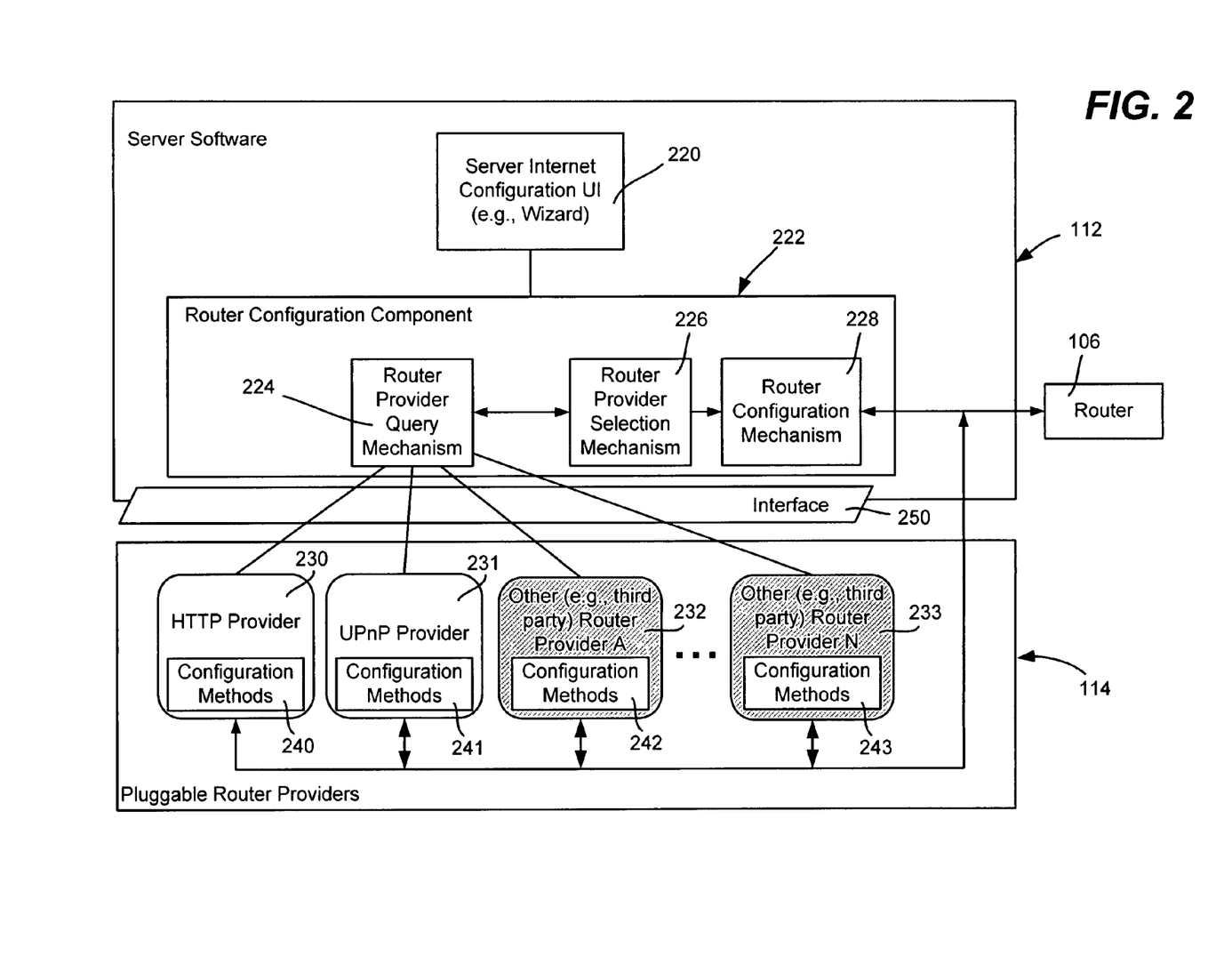
FIG. 2 is a block diagram representing example components for programmatically choosing a provider to configure a router.

In one example implementation generally represented in FIG. 2, the server software 112 includes a server Internet configuration user interface 220, such as a wizard. Coupled to the user interface 220 is a router configuration component 222, which includes logic (e.g., a single block of code or components) that communicates with each of the router providers 114, chooses one, and works with the chosen provider to configure the router 106. In FIG. 2, the logic of the router configuration component 222 is represented by a router provider query mechanism 224, a router provider selection mechanism 226, and a router configuration mechanism 228. Note that the router provider selection mechanism may be incorporated into the user interface 220; indeed, as described below, in one example implementation the router configuration component 222 is a subcomponent of the user interface 220, and thus any of the logic in the router configuration component 222 may be considered as within the user interface component 220.

Also represented in FIG. 2 are the pluggable router providers 230-233, each of which contains (or is otherwise associated with) a set of configuration methods, shown as blocks 240-243, respectively. The providers plug into the router configuration via a suitable interface 250, an example of which is set forth below. Note that it is feasible to have at least some configuration methods shared by providers. Further note that while four providers 230-233 are shown, any practical number may be present, and indeed the "N" in provider 233 may represent any number. The server may include its own providers by default, e.g., the HTTP provider 230 and the UPnP provider 231 may be shipped with the server software 112 as default configuration methods, and while represented in FIG. 2 as pluggable components, may be incorporated into the server software 112. Another provider may correspond to "Web Services for Devices" (WSD), which may be shipped with the server software as default configuration methods, or may be separately available.

In general, the router configuration component configures any brand of router by having "plug-in" pieces of software from each router provider. To this end, each router provider plug-in registers on installation, and announces the services it can configure on the router (e.g., to a registrar) of the server software 112. In one implementation, as described below, the service with the highest amount of configurability is chosen by the user interface 220 to configure the router. This approach allows the router manufacturers the greatest amount of flexibility. The choice is theirs on what protocols and security level they use to configure their router.

In FIG. 2, the user interface 220 allows a single interface for an Administrator to configure an Internet connection and a network firewall. The user interface 220 communicates with the router configuration component 222 to configure the ports and router configuration pieces asked for by the user from the user interface 220. Note that the user interface 220 does not care which provider is used to configure the router, just that it is configured.

The router configuration component 222 is responsible for configuration of the router/gateway device 106 on the network. To this end, the router configuration component 222 (as represented via the query mechanism 224) queries each provider to determine the best router provider to use for a given router that appears on the network, based upon a scoring system. To this end, the router configuration component 222 passes the IP address of the router 106 to each of the providers 230-233. Each provider in turn attempts to access the router 106 on a set of configuration methods 240-243, and as described below, returns a score to the router configuration component 222, which (as represented via the selection mechanism 226) makes a decision on which provider to use for the given router 106.

In one example implementation, the configuration methods are each given a value (a score) such when added together, each provider obtains a number score from which the capabilities of that router provider with respect to configuring the router 106 may be determined. In this example implementation, the values are rated for what are deemed most important for making the ongoing router configuration for a small business owner or other user as easy as possible. The table below sets forth one suitable scoring system; (note that other configuration methods may be added, e.g., to establish a score for whether authenticated configuration is possible):

| Configuration Method | Value |
|---|---|
| NoConfigPossible | 0 |
| TelnetManualConfigPossible | 1 |
| HttpManualConfigPossible | 2 |
| HttpsManualConfigPossible | 4 |
| NatSwitch | 8 |
| DhcpSwitch | 16 |
| PortMapping | 32 |

By way of example, consider a router provided by CompanyA that is present on a small business network. As part of the query operation, the IP address of this router is handed to the router configuration providers. The HTTP provider 230 includes a generic configuration method that attempts to open port 80 and 443 (HTTP and HTTPS); should these respond, the score is six (2+4=6) from the above table. Responding with six (6) tells the router configuration component 222 that the HTTP provider can configure both HTTP and HTTPS (whereas a score of two (2) would tell router configuration component 222 that only HTTP was possible). The UPnP provider 231 may return a score of zero (for example if UPnP was not installed or enabled on the physical router). However, a provider (e.g., 232) supplied by CompanyA may support all of the above, whereby it would return a perfect score of sixty-three (1+2+4+8+16+32=63). Based upon the returned scores, the router configuration component 222 chooses the CompanyA router provider 232 for configuring this router.

To extend the above example, consider that the administrator replaces the CompanyA router with a router from CompanyB, which does not have a router configuration provider. When the administrator ran the user interface 220, the router configuration component 222 goes through the same methodology, but this time may choose a different router provider. For example, the HTTP provider 230 may again return six (6) as its score, while the UPnP provider 231 may return thirty-eight (2+4+32=38). Because the router vendor is different, CompanyA's provider 232 which is still plugged into the server software 112 is not able to configure this router (e.g., it may use a proprietary protocol that only works with CompanyA's routers), and returns a value of zero (0), making it the least viable option for configuration. In this extended example scenario, the router configuration component 222 chooses the UPnP provider 231 to configure the new router.

Figure 3:
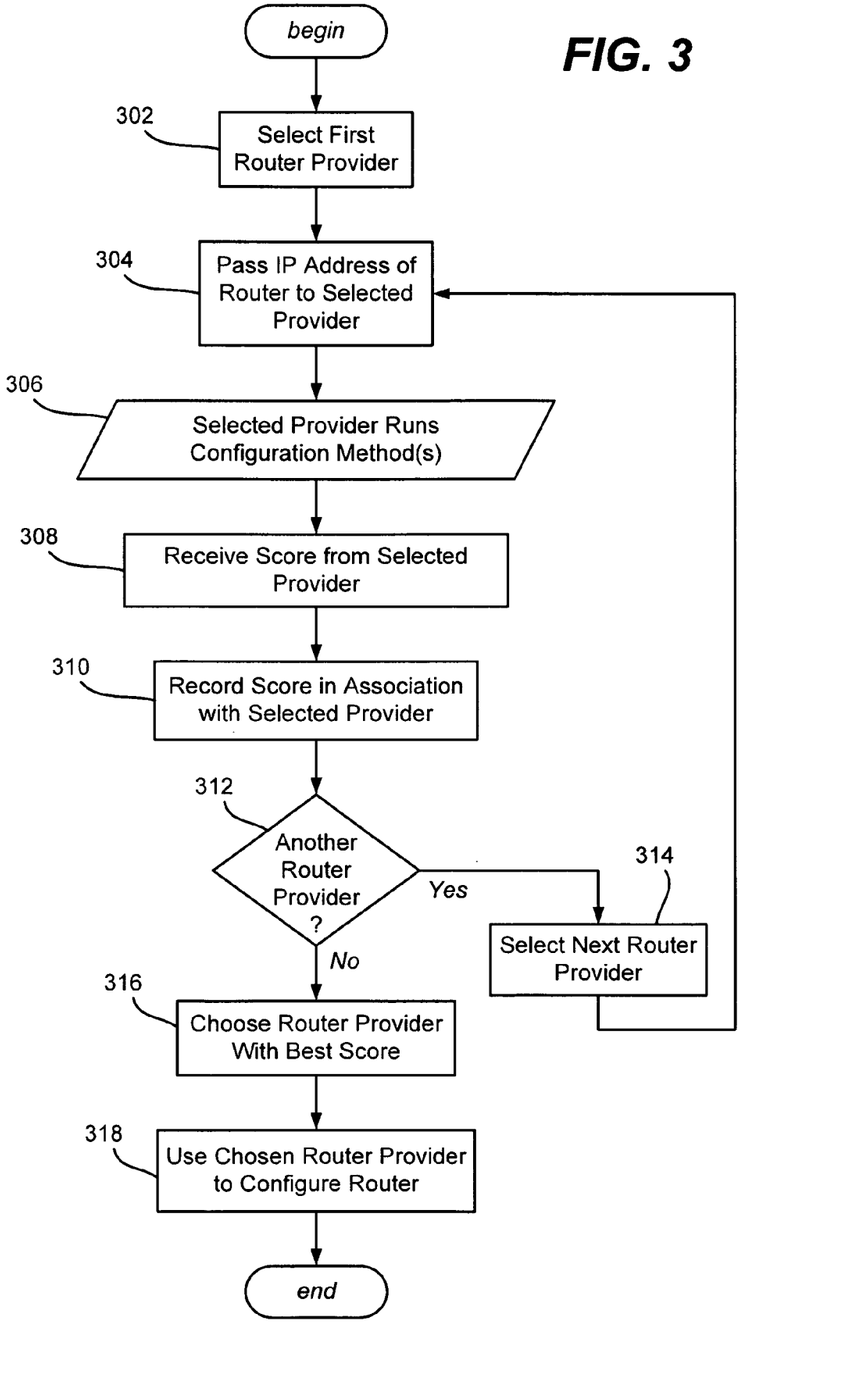
FIG. 3 is a flow diagram representing example steps taken to programmatically choosing a provider to configure a router.

To summarize the operation, FIG. 3 is an example flow diagram, beginning at step 302 in which a router provider is selected, and step 304 at which the IP address of the router is passed to the selected provider. Note that FIG. 3 exemplifies one provider being selected at a time for use with the router, however it is understood that at least some of the steps of FIG. 3 may operate in parallel.

Step 306 represents the selected provider performing its configuration methods to obtain a score based on how the router responds. Steps 308 and 310 represent receiving the score in response to the query and storing the returned score (e.g., in the selection mechanism 226) in association with the identity of the selected provider that returned the score.

Steps 312 and 314 represent repeating the process for all plugged-in (or otherwise available) providers until none remain. Note that again, some of these steps may be performed in parallel. Also note that the process may terminate early if any provider returns a perfect score.

Step 316 represents choosing the provider with the best (highest) score. In the event two or more providers are tied for the best score, any tie-breaking mechanism may be employed, e.g., the first one that returned that highest score. Step 318 represents using the chosen provider to configure the router.

Exemplary Operating Environment

Figure 4:
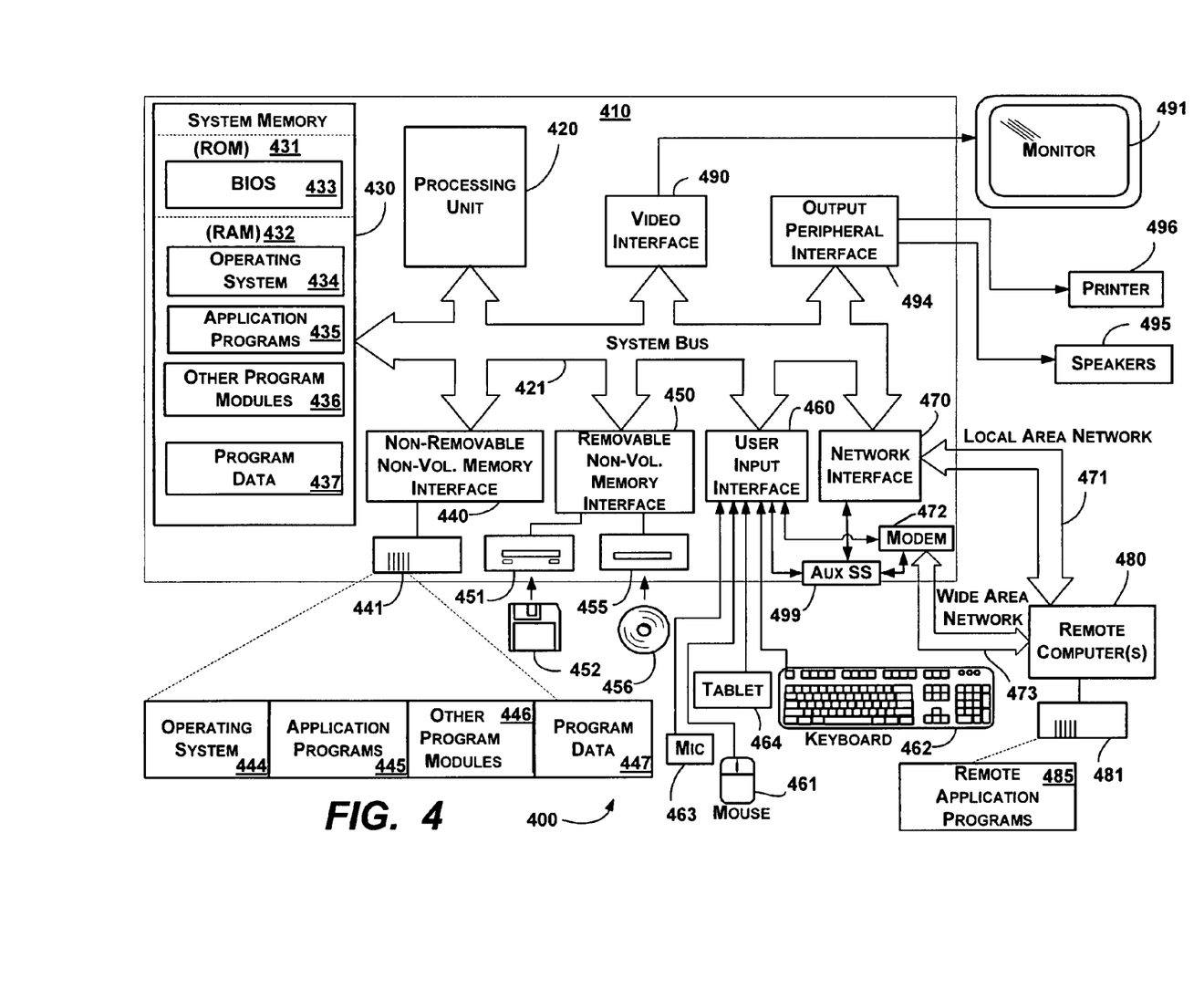
FIG. 4 shows an illustrative example of a general-purpose network computing environment into which various aspects of the present invention may be incorporated.

FIG. 4 illustrates an example of a suitable computing system environment 400 on which the server 110 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage device having computer-executable instructions, which when executed enable a computing system to perform steps, comprising:

communicating with a plurality of router providers to determine whether each router provider of the plurality of router providers is capable of performing each of a plurality of types of configurations with respect to a router;

receiving a plurality of scores from the plurality of respective router providers, each score based on a plurality of values that indicates whether the router provider from which the score is received is capable of performing the plurality of respective types of configurations; and choosing a first router provider that is to configure the router from among the plurality of router providers based on a first score of the plurality of scores that is received from the first router provider being greater than other scores of the plurality of scores;

wherein each score indicates whether the respective router provider is capable of performing a Telnet manual configuration, whether the respective router provider is capable of performing a HTTP manual configuration, whether the respective router provider is capable of performing a HTTPS manual configuration, whether the respective router provider is capable of performing a Network Address Translation (NAT) switch configuration, whether the respective router provider is capable of performing a dynamic host configuration protocol (DHCP) switch configuration, whether the respective router provider is capable of performing an authenticated configuration, and whether the respective router provider is capable of performing port mapping; and wherein each score comprises a sum of the plurality of values on which the score is based, wherein the values are weighted such that port mapping capability has a higher weight than DHCP switch configuration capability which has a higher weight than NAT switch configuration capability which has a higher weight than HTTPS manual configuration capability which has a higher weight than HTTP manual configuration capability which has a higher weight than Telnet manual configuration capability.

2. The computer storage device of claim 1 wherein communicating with the plurality of router providers comprises passing an IP address of the router to each provider.

3. The computer storage device of claim 1 wherein each score comprises a sum of the plurality of values, wherein a first value that indicates whether the respective router provider is capable of performing a Telnet manual configuration equals one, wherein a second value that indicates whether the respective router provider is capable of performing a HTTP manual configuration equals two, wherein a third value that indicates whether the respective router provider is capable of performing a HTTPS manual configuration equals four, wherein a fourth value that indicates whether the respective router provider is capable of performing a NAT switch configuration equals eight, wherein a fifth value that indicates whether the respective router provider is capable of performing a DHCP switch configuration equals sixteen, and wherein a sixth value that indicates whether the respective router provider is capable of performing port mapping equals thirty-two.

4. The computer storage device of claim 1, wherein choosing the first router provider comprises:
choosing the first router provider during reconfiguration of the router in response to a server being added to a network that includes the router.

5. The computer storage device of claim 1, wherein choosing the first router provider comprises:
choosing the first router provider in response to the router being substituted for another router in a network.

6. The computer storage device of claim 1, wherein choosing the first router provider comprises:
choosing the first router provider further based on the first router provider having a greatest configurability of the plurality of router providers.

7. The computer storage device of claim 1, wherein the first score that is received from the first router provider is same as a second score of the plurality of scores that is received from a second router provider of the plurality of router providers; and
wherein choosing the first router provider comprises:
choosing the first router provider further based on the first score being received before the second score.

8. In a computer network, a method comprising:
passing an IP address of a router to each of a plurality of router providers, each router provider using the IP address to determine that provider's capabilities with respect to configuring the router;
receiving a score from each router provider indicative of that provider's capabilities with respect to configuring the router; and
choosing a router provider that has the best score relative to the other router providers for configuring the router;
wherein each score indicates whether the respective router provider is capable of performing a Telnet manual configuration, whether the respective router provider is capable of performing a HTTP manual configuration, whether the respective router provider is capable of performing a HTTPS manual configuration, whether the respective router provider is capable of performing a Network Address Translation (NAT) switch configuration, whether the respective router provider is capable of performing a dynamic host configuration protocol (DHCP) switch configuration, whether the respective router provider is capable of performing an authenticated configuration, and whether the respective router provider is capable of performing port mapping; and
wherein each score comprises a sum of values, wherein the values are weighted such that port mapping capability has a higher weight than DHCP switch configuration capability which has a higher weight than NAT switch configuration capability which has a higher weight than HTTPS manual configuration capability which has a higher weight than HTTP manual configuration capability which has a higher weight than Telnet manual configuration capability.

9. The method of claim 8, wherein choosing the router provider comprises:
choosing the router provider during reconfiguration of the router in response to a server being added to the computer network.

10. The method of claim 8, wherein choosing the router provider comprises:
choosing the router provider in response to the router being substituted for another router in the computer network.

11. The method of claim 8, wherein choosing the router provider comprises:
choosing the router provider further based on that router provider having a greatest configurability of the plurality of router providers.

12. In a computer network having a router, a system comprising:
a plurality of providers coupled to the router; and
a router configuration component coupled to the plurality of providers via a defined interface, the router configuration component configured to communicate via the interface to determine whether each provider of the plurality of providers is capable of performing each of a plurality of types of configurations with respect to the router, the router configuration component further configured to choose one provider for configuring the router from among the plurality of providers based upon a first score of a plurality of scores that is received from the one provider being greater than other scores of the plurality of scores, the plurality of scores being received from the plurality of respective providers, each score based on a plurality of values that indicates whether the provider from which the score is received is capable of performing the plurality of respective types of configurations;
wherein each score indicates whether the respective provider is capable of performing a Telnet manual configuration, whether the respective provider is capable of performing a HTTP manual configuration, whether the respective provider is capable of performing a HTTPS manual configuration, whether the respective provider is capable of performing a Network Address Translation (NAT) switch configuration, whether the respective provider is capable of performing an authenticated configuration, whether the respective provider is capable of performing a dynamic host configuration protocol (DHCP) switch configuration, and whether the respective provider is capable of performing port mapping; and
wherein each score comprises a sum of the plurality of values on which the score is based, wherein the values are weighted such that port mapping capability has a higher weight than DHCP switch configuration capability which has a higher weight than NAT switch configuration capability which has a higher weight than HTTPS manual configuration capability which has a higher weight than HTTP manual configuration capability which has a higher weight than Telnet manual configuration capability.

13. The system of claim 12 wherein the router configuration component is a subcomponent of a user interface of a server software program.

14. The system of claim 12 wherein the plurality of providers includes an HTTP provider, or a UPnP provider, or both an HTTP provider and a UPnP provider.

15. The system of claim 12 wherein the plurality of providers includes a Web Services for Devices (WSD) provider.

16. The system of claim 12 wherein the plurality of providers includes at least one provider that uses a proprietary protocol to communicate with routers.

17. The system of claim 12 wherein each score comprises a sum of the plurality of values, wherein a first value that indicates whether the respective provider is capable of performing a Telnet manual configuration equals one, wherein a second value that indicates whether the respective provider is capable of performing a HTTP manual configuration equals two, wherein a third value that indicates whether the respective provider is capable of performing a HTTPS manual configuration equals four, wherein a fourth value that indicates whether the respective provider is capable of performing a NAT switch configuration equals eight, wherein a fifth value that indicates whether the respective provider is capable of performing a DHCP switch configuration equals sixteen, and wherein a sixth value that indicates whether the respective provider is capable of performing port mapping equals thirty-two.

18. The system of claim 12 wherein each of the plurality of providers is associated with configuration methods, including a method that attempts to open at least one port.

19. The system of claim 12 wherein the router configuration component is configured to provide an IP address of the router to each provider of the plurality of providers.

20. The method of claim 8, wherein choosing the router provider comprises:
replacing a default router provider, which is associated with the router, with the router provider that has the best score relative to the other router providers for configuring the router.

* * * * *